(12) United States Patent
Sung (10) Patent No.: US 6,407,380 B1
(45) Date of Patent: Jun. 18, 2002

(54) SCANNING APPARATUS USING AN INDIRECT-CONTACT TRANSMISSION ARRANGEMENT

(75) Inventor: Li-Fu Sung, Taipei (TW)

(73) Assignee: Acer Peripherals, Inc., Taoyuan (TW)

( * ) Notice: Subject to any disclaimer, the term of this patent is extended or adjusted under 35 U.S.C. 154(b) by 66 days.

(21) Appl. No.: 09/592,573

(22) Filed: Jun. 12, 2000

(30) Foreign Application Priority Data

Jun. 29, 1999 (TW) .................................. 88210704 U
Jun. 29, 1999 (TW) .................................. 88210705 U (51) Int. Cl.[7] ................................................ H04N 1/04
(52) U.S. Cl. ...................... 250/234; 400/319; 400/320
(58) Field of Search ........................... 250/234, 235; 399/210; 400/319, 320, 335

(56) References Cited

U.S. PATENT DOCUMENTS

| | | | | |
|---|---|---|---|---|
| 5,749,025 A | * | 5/1998 | Oda et al. ................... | 399/211 |
| 5,912,458 A | * | 6/1999 | Squires et al. ............... | 250/234 |
| 5,924,809 A | * | 7/1999 | Wotton et al. ............... | 400/691 |
| 6,004,050 A | * | 12/1999 | Rehman et al. .............. | 400/319 |
| 6,144,465 A | * | 11/2000 | Hayashi ....................... | 358/474 |
| 6,244,765 B1 | * | 6/2001 | Harriman et al. ........... | 400/319 |
| 6,310,638 B1 | * | 10/2001 | Heiles et al. ................. | 347/37 |

OTHER PUBLICATIONS

Avallone et al., Marks' Standard Handbook for Mechanical Engineers, 1996, McGraw–Hill, 10th Ed., p. 3–65.*
Barber, Antony, Handbook of Noise and Vibration Control, 1992, Elsevier Science publishers Ltd., 6th Ed., pp. 415–416.*
Hansen et al., Mechanics of Vibration, 1952, John Wiley & Sons, Inc., pp. 78–79.*
Serway, Raymond A., Physics for Scientists & Engineers with Modern Physics, 1992, Saunders College Publishing, 3rd Ed., pp. 329, 804, and 889.*

* cited by examiner

Primary Examiner—Robert H. Kim
Assistant Examiner—Chih-Cheng G Kao
(74) Attorney, Agent, or Firm—Rabin & Berdo, P.C.

(57) ABSTRACT

An image reading apparatus utilizing an indirect-contact transmission arrangement. The image reading apparatus includes a securing apparatus for placing a object for scanning; an image receiving apparatus; a guiding shaft; a transmitting component which can slide along the guiding shaft and drive the securing apparatus to move relatively to the image receiving apparatus via an indirect-contact component; and a dragging component which connects and drives the transmitting component. The indirect-contact component prevents the dragging component from transmitting vibrations generated during the scanning process to either the securing apparatus or the image receiving apparatus.

7 Claims, 12 Drawing Sheets

SCANNING APPARATUS USING AN INDIRECT-CONTACT TRANSMISSION ARRANGEMENT

BACKGROUND OF THE INVENTION

This application incorporates by reference Taiwanese application Serial No. 88210704, filed Jun. 29, 1999 and No. 88210705, filed Jun. 29, 1999.

1. Field of the Invention

The invention generally relates to a scanning apparatus using an indirect contact transmission in a scanning module, and more particularly to the techniques utilizing indirect contact arrangements to reduce vibration and thus improve the scanning image quality.

2. Description of the Related Art

Along with the development of new techniques and processes, the integration and the application of the multimedia has become a trend. The multimedia integrates various data types, such as text, image, and sound. To store or display data in the form of multimedia, many multimedia apparatuses have been developed. As for the image processing, a scanning apparatus such as a scanner is one of the apparatuses that users use to retrieve images.

Figure 1:
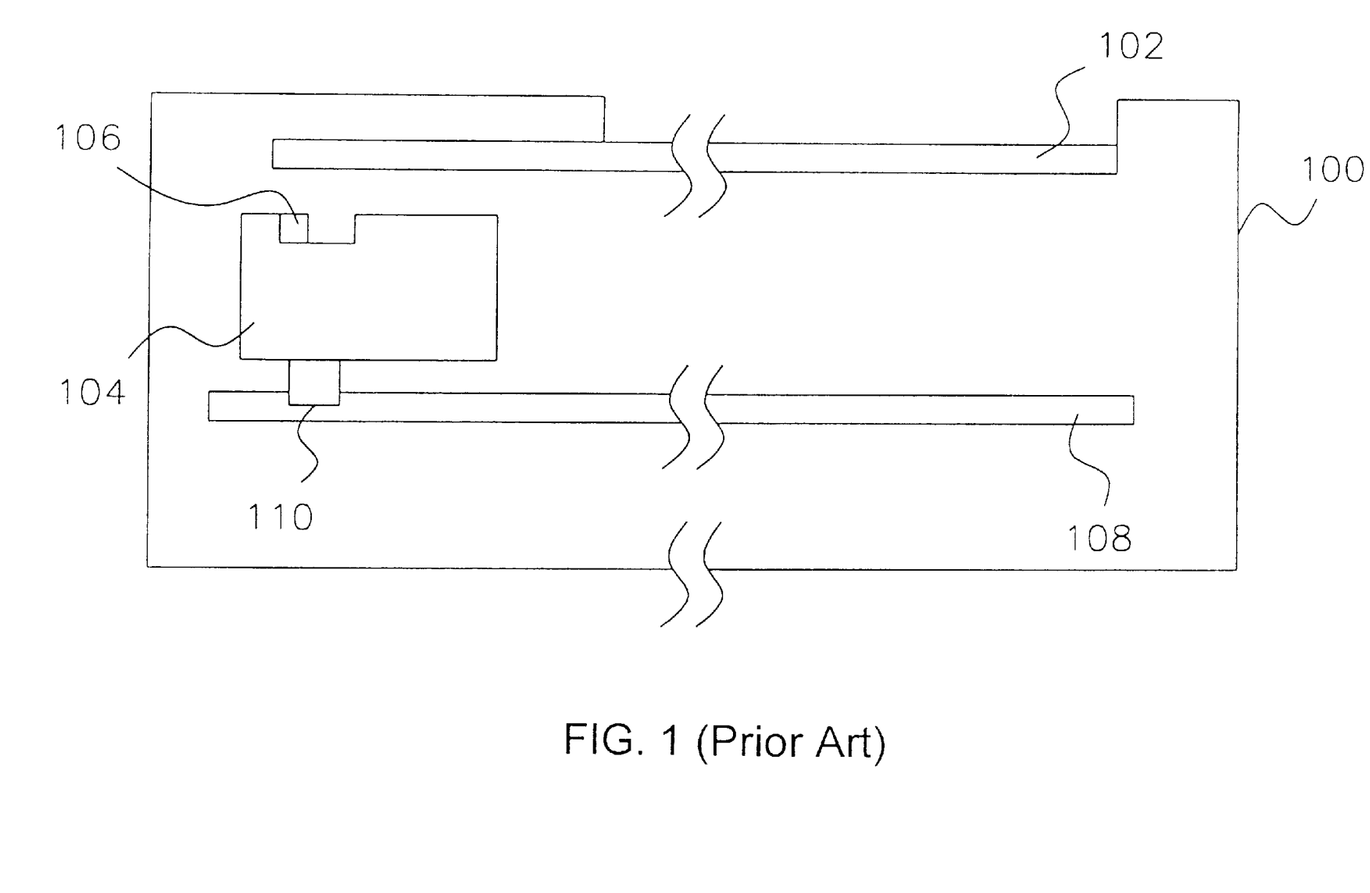
FIG. 1 (Prior Art) is a sectional view of the structure of a conventional flatbed scanning apparatus.

FIG. 1 shows the sectional view of a conventional flatbed scanner. The scanner has a case 100. Above the case 100, there is a window glass 102 where the object to be scanned is placed. Inside the case 100, there is an image receiving apparatus 104. A lighting apparatus 106 is set up thereon. The flatbed scanner utilizes a dragging apparatus 108 to drive the image receiving apparatus 104. A connecting apparatus 110 is utilized to connect the image receiving apparatus 104 to the dragging apparatus 108. When the scanning process starts, the dragging apparatus 108 drives both the image receiving apparatus 104 and the lighting apparatus 106 via the connecting apparatus 110. The lighting apparatus 106 sends out light, which is reflected by the object placed on the window glass 102 afterward. The reflected light is received by the image receiving apparatus 104 and transformed to digital signals for later processing. In this way, the image of the scanned object is transformed to electrical signals and the image scanning process is completed. The technique mentioned above is for scanning opaque objects, such as document sheets. When scanning transparent objects, the scanning apparatus turns off the lighting apparatus 106 and turns on the lights (not shown in the drawing) mounted above the window glass 102. The other processes are similar to what mentioned above.

Figure 2:
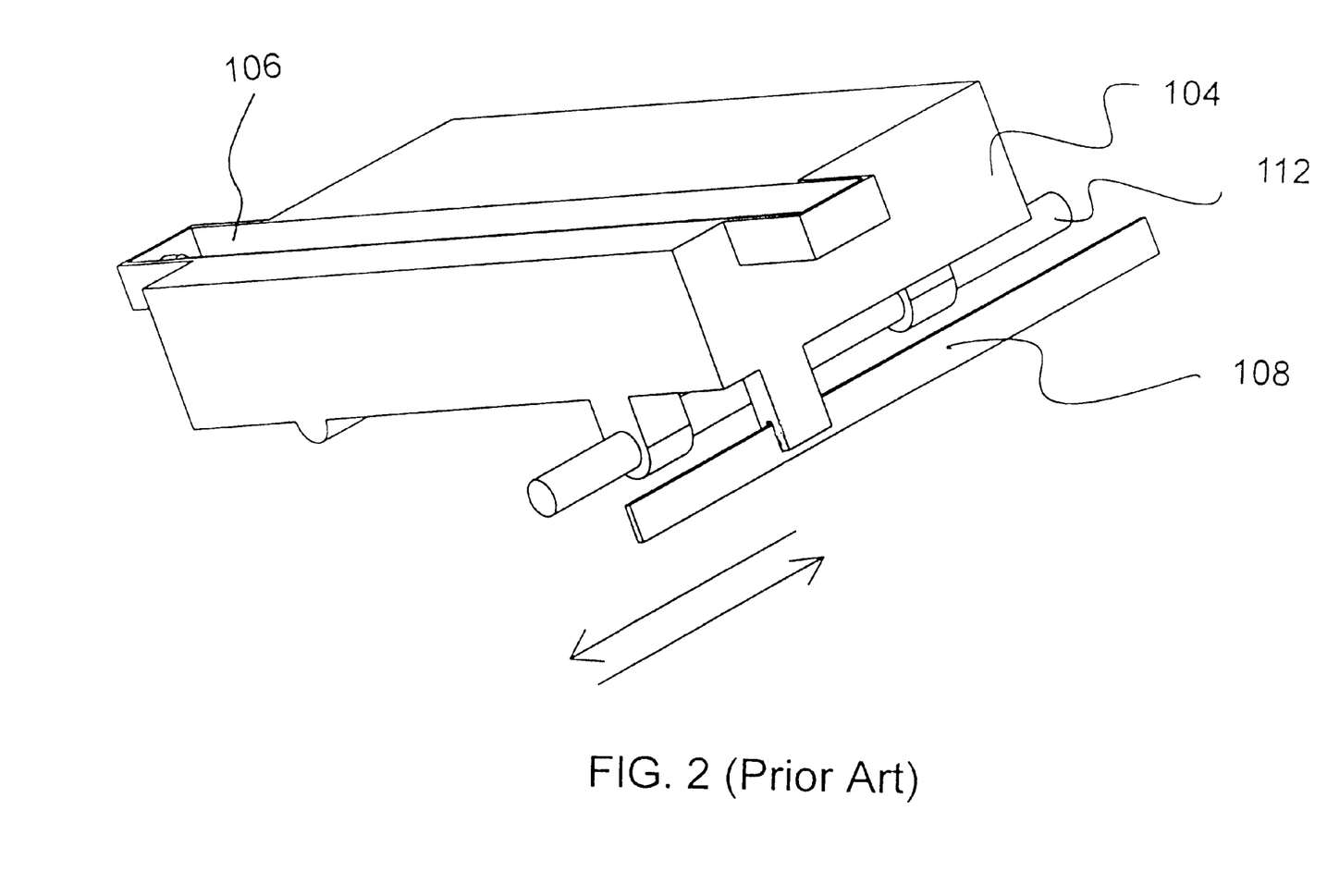
FIG. 2 (Prior Art) is a perspective view of the transmission arrangement of FIG. 1.

FIG. 2 is a perspective view of the transmission part of FIG. 1. In FIG. 2, the guiding shaft 112 is fixed inside the scanner. The image receiving apparatus 104 is set up and can slide along the guiding shaft 112. One side of the image receiving apparatus 104 is connected to the dragging apparatus 108, which drives the image receiving apparatus 104 to slide along the guiding shaft 112.

Figure 3:
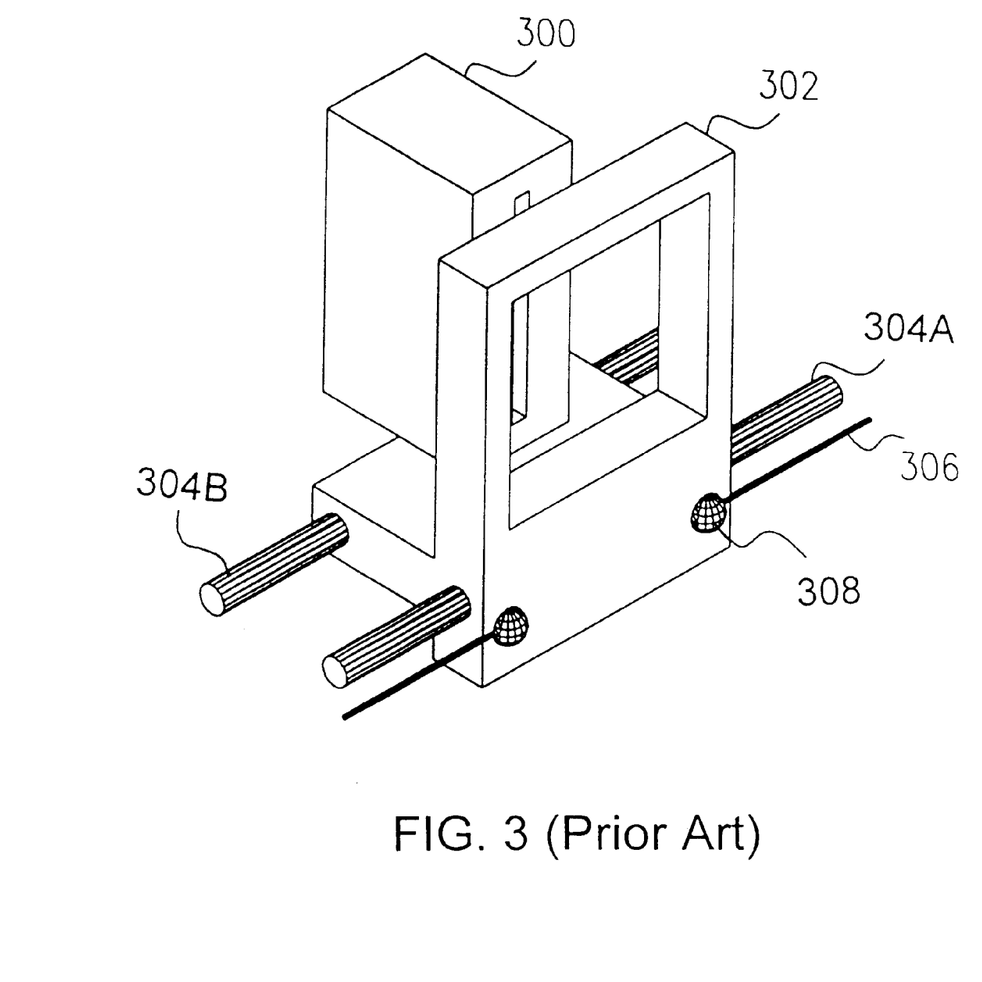
FIG. 3 (Prior Art) is a perspective view of the transmission arrangement of another conventional scanning apparatus.

FIG. 3 is a perspective view of the transmission part in a scanning module of another conventional scanning apparatus. In FIG. 3, an image receiving apparatus 300 includes a photoelectric sensing component, e.g. a charge coupled device (CCD), a contact image sensor (CIS), or other sensing components that can transform a light signal into an electrical signal. Opposite to the image receiving apparatus 300, there is a securing apparatus 302 which can slide along a pair of guiding shafts 304A and 304B during the scanning process. Furthermore, a dragging component 306 is connected to the securing apparatus 302 by the connecting points 308. When scanning, the object to be scanned is placed on the securing apparatus 302 and the image receiving apparatus 300 is fixed. The dragging component 306 drives the securing apparatus 302 to move along the guiding shafts 304A, 304B via the connecting points 308. The image signals are received by the image receiving apparatus 300 for further processing. The above-mentioned dragging component 306 can be a steel rope, a belt, a gear train, a worm, or other components that can drive the securing apparatus 302.

Due to the fact that the dragging component 306 directly drives the securing apparatus 302, the vibrations generated by the dragging component 306 during the transmission process, such as the vibrations of the steel rope, the belt, the clutching of the gear train, the disequilibrium of the belt force, will be transmitted directly to the securing apparatus 302. These vibrations will cause many unnecessary relative movements between the fixed image receiving apparatus 300 and the moving securing apparatus 302. Thus, the quality of scanning is greatly affected. For a high-resolution scanning apparatus, such as a 2700 dpi (dot per inch) scanner, any unnecessary small vibrations can cause serious distortion of the image.

SUMMARY OF THE INVENTION

It is therefore an object of the invention to provide an indirect-contact component to reduce the vibrations and thus improve the quality of scanning. The indirect-contact component is added between the dragging component and either the securing apparatus or the image receiving apparatus. The indirect-contact component prevents the dragging component from being connecting directly to the securing apparatus or the image receiving apparatus. As a result, there will be fewer vibrations transmitted from the dragging component to the securing apparatus or the image receiving apparatus. Thus, the image quality can be effectively improved.

The invention achieves the above-identified object by providing an indirect-contact transmission arrangement for driving either a securing apparatus or an image receiving apparatus. The transmission arrangement includes a guiding shaft, a transmitting component, an indirect-contact component and a dragging component. The securing apparatus is used to place the scanning object, such as a document or a positive film. The image receiving apparatus is used to receive light signals reflected or transmitted from the scanned object. Then, the light signals are transformed to corresponding electrical signals for further processing. According to the invention, the dragging component connects and drives the transmitting component, which in turn drives either the securing apparatus or the image receiving apparatus. Here, the indirect-contact component can be an indirect-contact, gap-controllable component, a point-contact component or a low-rigidity, indirect-contact component. By this way, the vibrations generated by the dragging component during the transmission process will not transmitted directly to the securing apparatus or the image receiving apparatus. Therefore, relative vibrations between the scanning image and the image receiving apparatus can be greatly reduced during the scanning process and the image quality can be effectively improved.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 4:
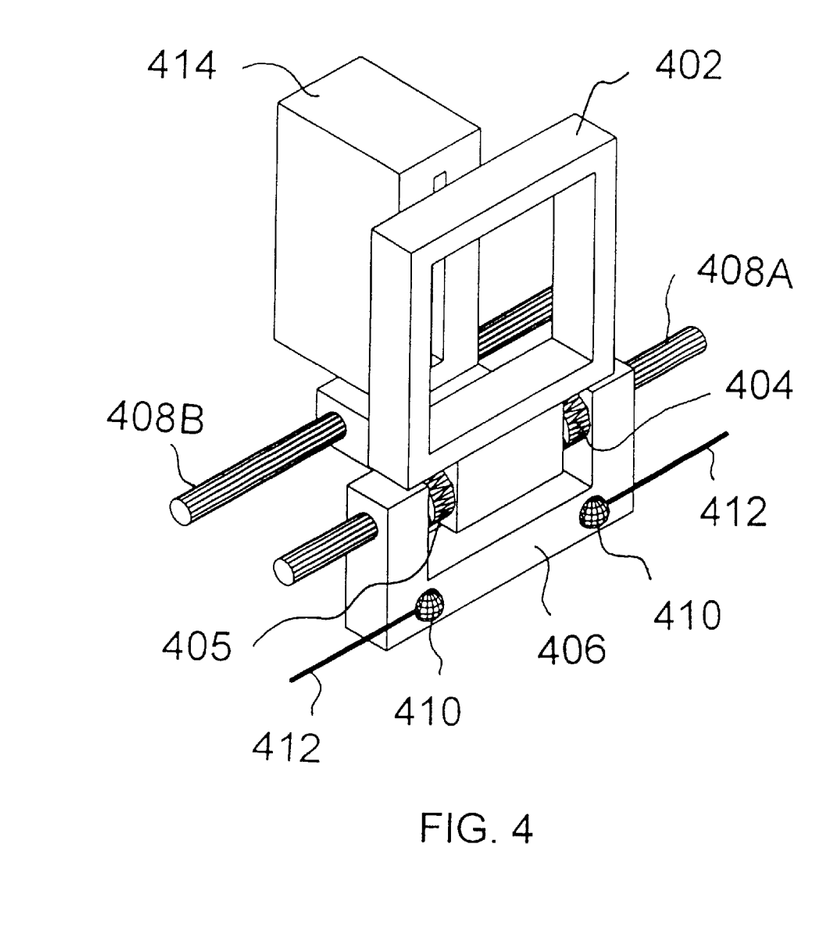
FIG. 4 is a perspective view of a transmission arrangement of the image scanning apparatus according to a preferred embodiment of the invention.

A scanning apparatus which is disclosed in this preferred embodiment is to retrieve image of a scanning object. Referring first to FIG. 4, the scanning object is placed on the securing apparatus 402. One end of the securing apparatus 402, which can slide along the first guiding shaft 408A, is coupled to the transmitting component 406 by the indirect-contact components 404 and 405. The transmitting component 406 is further connected to the dragging component 412 by the connecting points 410. The other end of the securing apparatus 402 can slide along the second guiding shaft 408B. Furthermore, opposite to the securing apparatus 402, there is an image receiving apparatus 414. The image receiving apparatus 414 can be a photoelectric sensing component, for example, a charge coupled device (CCD) or a contact image sensor (CIS). During the scanning process, the dragging component 412 drives the transmitting component 406 via the connecting points 410. Then, the transmitting component 406 drives the securing apparatus 402 by the indirect-contact components 404, 405. Next, the image receiving apparatus 414 receives light signals from the scanning object on the securing apparatus 402 and transforms these light signals to electrical signals. The dragging component 412 drives the securing apparatus 402 to slide along the guiding shafts 408A, 408B to complete the scanning operation. The transmission arrangement according to the invention can be applied to different kinds of scanning apparatuses that need to reduce the effects of the vibrations, such as flatbed scanners for scanning opaque or transparent objects, film scanners for scanning positive or negative films, photocopiers, and multi-functional peripherals (MFP).

FIG. 4 illustrates the invention with the fixed image receiving apparatus 414 and the movable securing apparatus 402. Similar idea could be applied in another scanning system with a fixed securing apparatus 402 and a movable image receiving apparatus 414.

Figure 8:
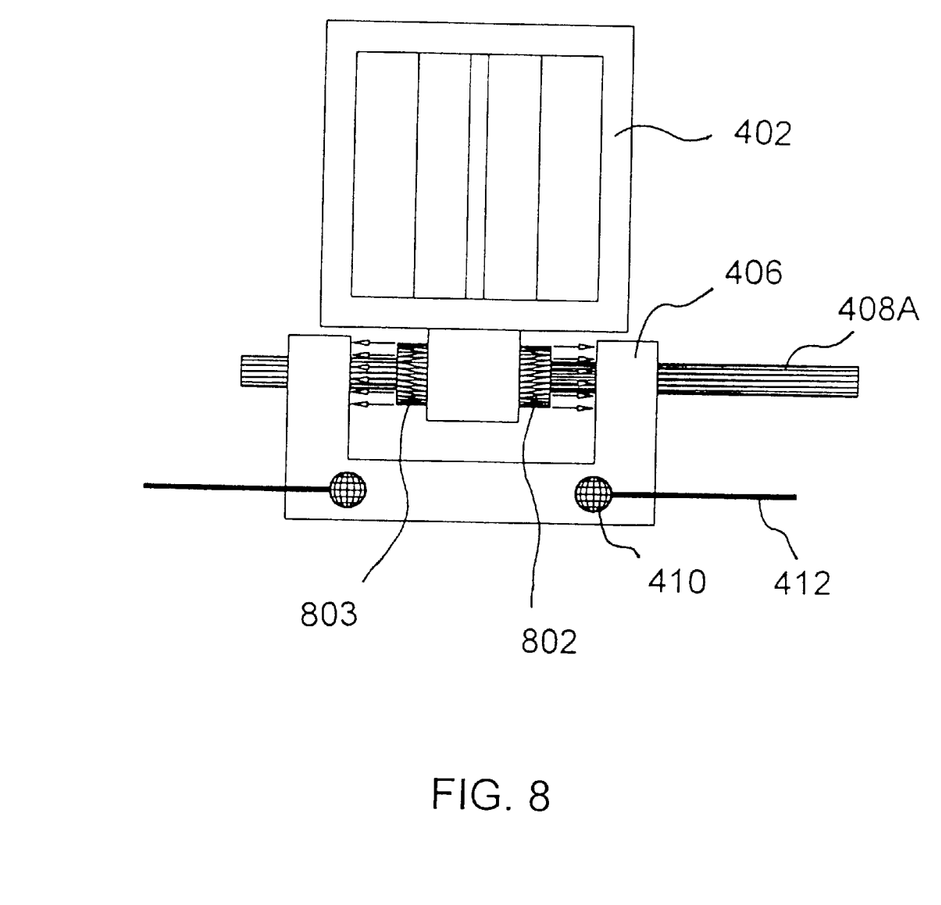
FIG. 8 is a lateral view of the transmission arrangement of the indirect-contact, gap-controllable arrangement component utilizing airstream-generating pairs.

In the above-mentioned embodiment, the dragging component 412 can be a steel rope, a belt, a gear train, or other components that can drive the transmitting component 406. The connecting points 410 can be screws or other fastening components. Further, the dragging component 412, the connecting points 410 and the transmitting component 406 can be integrated in one unit, i.e., as one piece. The indirect-contact, gap-controllable component can be magnets or airstream-generating pairs, which are illustrated in FIG. 5 and FIG. 8, respectively.

Figure 5:
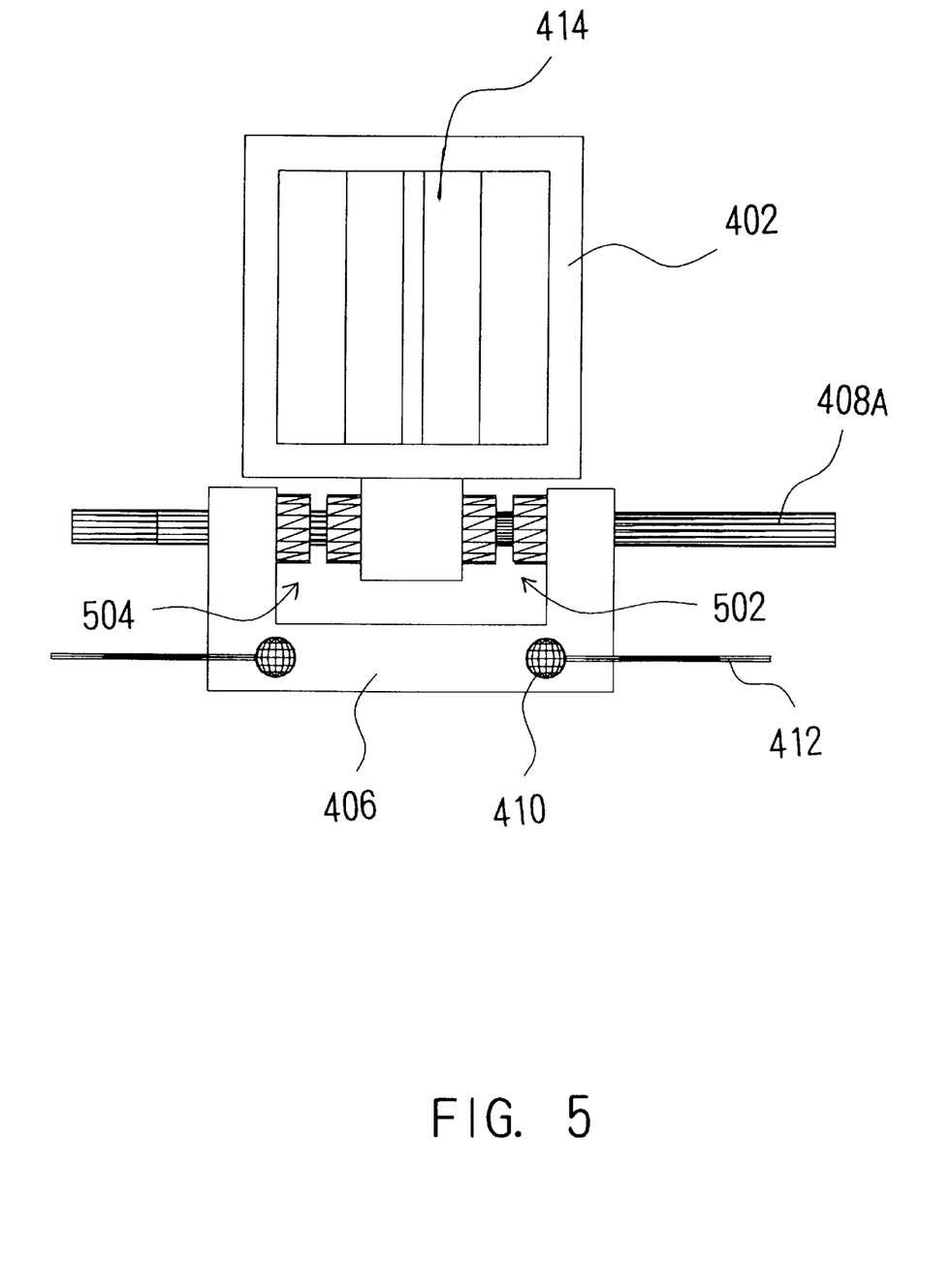
FIG. 5 is a lateral view of the transmission arrangement of the indirect-contact, gap-controllable component utilizing magnetic pairs.

Referring to FIG. 5, the indirect-contact, gap-controllable component is formed by two magnetic pairs. Also, electromagnets can take the place of the magnets. The indirect-contact, gap-controllable component in the embodiment includes a first magnetic pair 502 on the right side of the securing apparatus 402, and a second magnetic pair 504 on the left side. When the dragging component 412 starts, the dragging component 412 drives the transmitting component 406 by the connecting points 410. The first and second magnetic pair 502, 504 drives the securing apparatus 402 to slide along the guiding shaft 408A. The mechanisms are discussed below. When the dragging component 412 drives the transmitting component 406 to the right via the connecting points 410, the gap between two poles of the second magnetic pair 504 decreased. Therefore, the repulsive force between two poles becomes greater. Meanwhile, the gap between two poles of the first magnetic pair 502 increased and the repulsive force between two poles becomes smaller. The force difference of the repulsive forces of the first and the second magnetic pairs drives the securing apparatus 402 to move to the right. Consequently, there will be relative movements between the securing apparatus 402 and the image receiving apparatus 414, thus allowing the scanning operation to proceed.

Furthermore, the details are similar to those mentioned above when the dragging component 412 drives the transmitting component 406 to move to the left. Therefore, it will not be discussed here.

Figure 6:
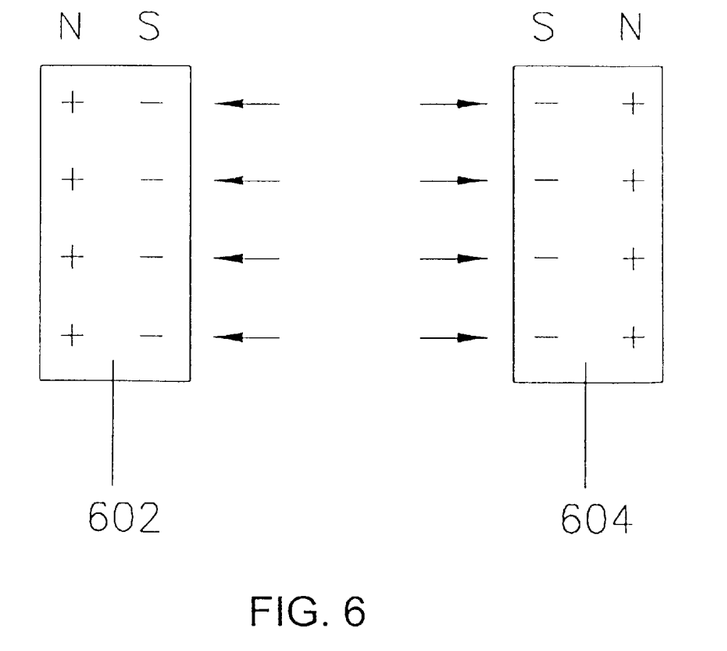
FIG. 6 is a structural diagram of the magnetic pair shown in FIG. 5.
Figure 7:
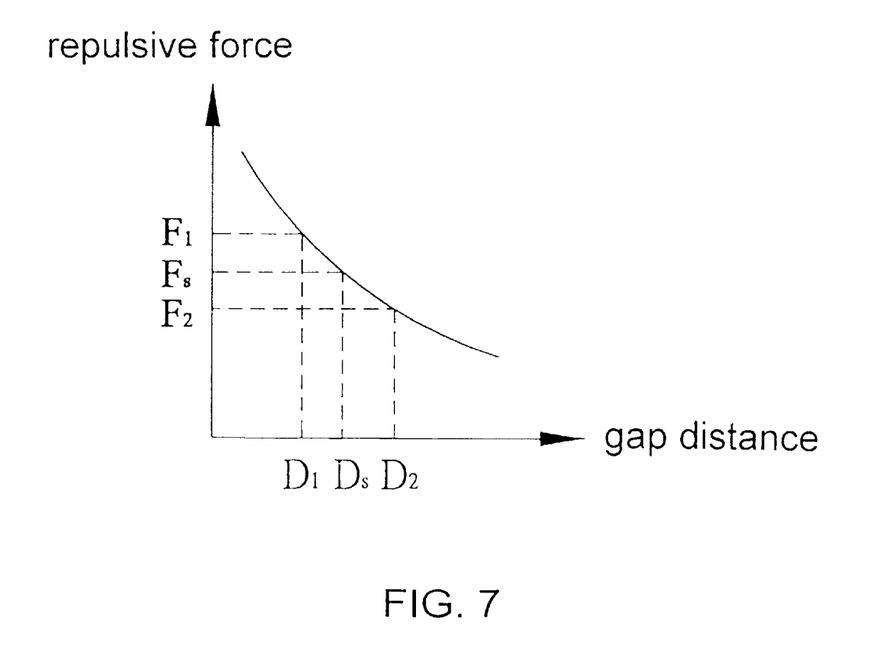
FIG. 7 is a diagram showing the relationship between the distance of the gap and the magnitude of the magnetic force.

Referring to FIG. 6, the magnetic pair 502 comprises a first magnet 602 and a second magnet 604 which are located on the transmitting component 406 and the securing apparatus 402 respectively. Identical poles of the first magnet 602 and the second magnet 604 are opposite to each other, that is, N faces N or S faces S. The repulsive force between two identical poles (N—N or S—S) keeps the two magnets in a distance. Therefore, the first magnet and the second magnet are separated by a gap. The relation between the length of the gap and the magnitude of the magnetic force is illustrated in FIG. 7. Thus, the gap can be controlled according to the relation shown in FIG. 7. The structure of the magnetic pair 504 is all the same to the magnetic pair 502, thus will not be redundantly described herein.

Referring to FIG. 5 and FIG. 7, suppose that the force needed to drive the securing apparatus 402 is F. If the first and second magnetic pairs as indicated in FIG. 5 are the same and their gaps between two magnets in static equilibrium state are both $D_s$. Then, the repulsive force $F_s$ corresponding to the gap $D_s$ is called preload. When the dragging component 412 drives the transmitting component 406 to the left of FIG. 5, the gap between the two poles of the first magnetic pair decreases to D1, and the gap of the second magnetic pair increase to D2, where $D2-D_s=D_s-D1$. Referring to FIG. 7, the repulsive forces corresponding to D1 and D2 are F1 and F2, respectively. F1 drives the securing apparatus 402 to move to the left and F2 drives the securing apparatus 402 to move to the right. When the absolute value of the difference of F1 and F2, ΔF, is greater than $F_s$, the securing apparatus 402 is driven, for example, to the left. As a result, a slightly variation in gap length will cause enough force difference AF to drive the securing apparatus 402.

It is worth noting that the values of the gaps D1 and D2 should be chosen appropriately. If the length of the gaps D1 and D2 are too long, the repulsive forces would be too small and the securing apparatus 402 could not be moved accurately and easily by the dragging component 412. Therefore, the scanned image quality may not be good. Even worse, the scanned image may be discontinuous. Further, if the length of the gaps D1 and D2 are too long, the preloads of the two magnetic pairs will be insufficient. Thus, the securing apparatus 402 will not follow the transmitting component 406 closely. On the other hand, if the length of gaps D1 and D2 are too small, preload $F_s$ will be too large and the first and second magnet 602, 604 inside the magnetic pair may collide with each other when the dragging component 412 drives the transmitting component 406. Furthermore, the vibrations caused by the dragging component 412 are easily transmitted to the securing apparatus 402 and thus the vibrations cannot be effectively reduced. In a conventional image scanning apparatus, the vibrations generated by the dragging component 412 during the transmission process will also vibrate the securing apparatus 402 and degrade the scanning quality. Vertical vibrations have the greatest effect to the scanned image quality. According to this embodiment, the indirect-contact, gap-controllable component utilizing: magnets can effectively reduce the vertical vibrations of the securing apparatus 402. For a high-resolution scanning apparatus, such as 2700 dpi scanners, the image quality can be enormously improved.

Referring to FIG. 8, airstream-generating pairs take the place of the magnetic pairs in the indirect-contact, gap-controllable component mentioned above. A first airstream-generating pair 802 and a second airstream-generating pair 803 are placed on both sides of the securing apparatus 402 respectively. Each airsteam-generating pair has a number of air-jetting holes (not shown in the figure) on it. The airstream is generated by the first and the second airstream-generating pair 802, 803 and is jetted out from the air-jetting holes to the transmitting component 406. The above-described purposes of the present invention can be achieved by utilizing the airstream-generating pairs 802 and 803 in a manner similar to the magnetic pairs.

Figure 9:
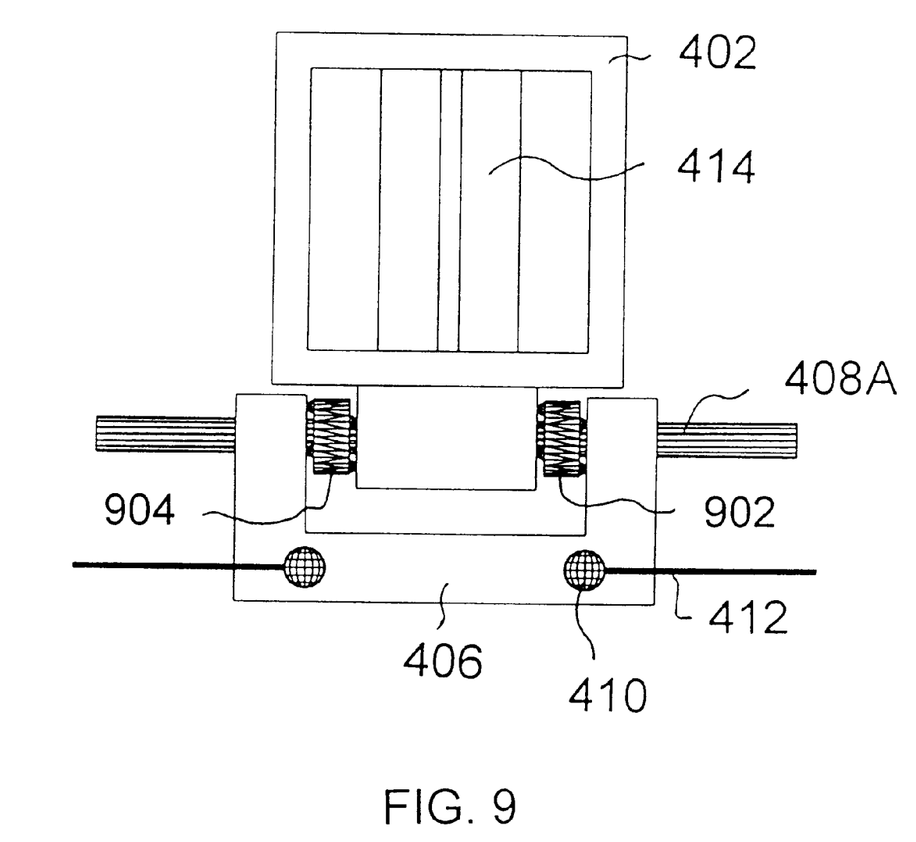
FIG. 9 is a lateral view of the transmission arrangement of the point-contact component utilizing point contactors.

Referring to FIG. 9, a point-contact component is utilized as the indirect-transmission part in another embodiment. The point-contact component includes a first point contactor 902 on the right side and a second point contactor 904 on the left side of the securing apparatus 402. When the dragging component 412 starts, the transmitting component 406 is driven by the dragging component 412 via the connecting points 410. Then, the point contactors 902 and 904 drive the securing apparatus 402 to slide along the guiding shaft 408A. That is, when the dragging component 412 drives the transmitting component 406 by the connecting points 410, the transmitting component 406 drives the securing apparatus 402 to slide along the guiding shaft 408A by the point contactors 902, 904. Therefore, relative movements between the securing apparatus 402 and the image receiving apparatus 414 are activated and make the scanning process proceed. Applying the point-contact component effectively reduces the vibrations, especially the vertical vibrations, of the securing apparatus 402 and thus improves the image quality.

Figure 10:
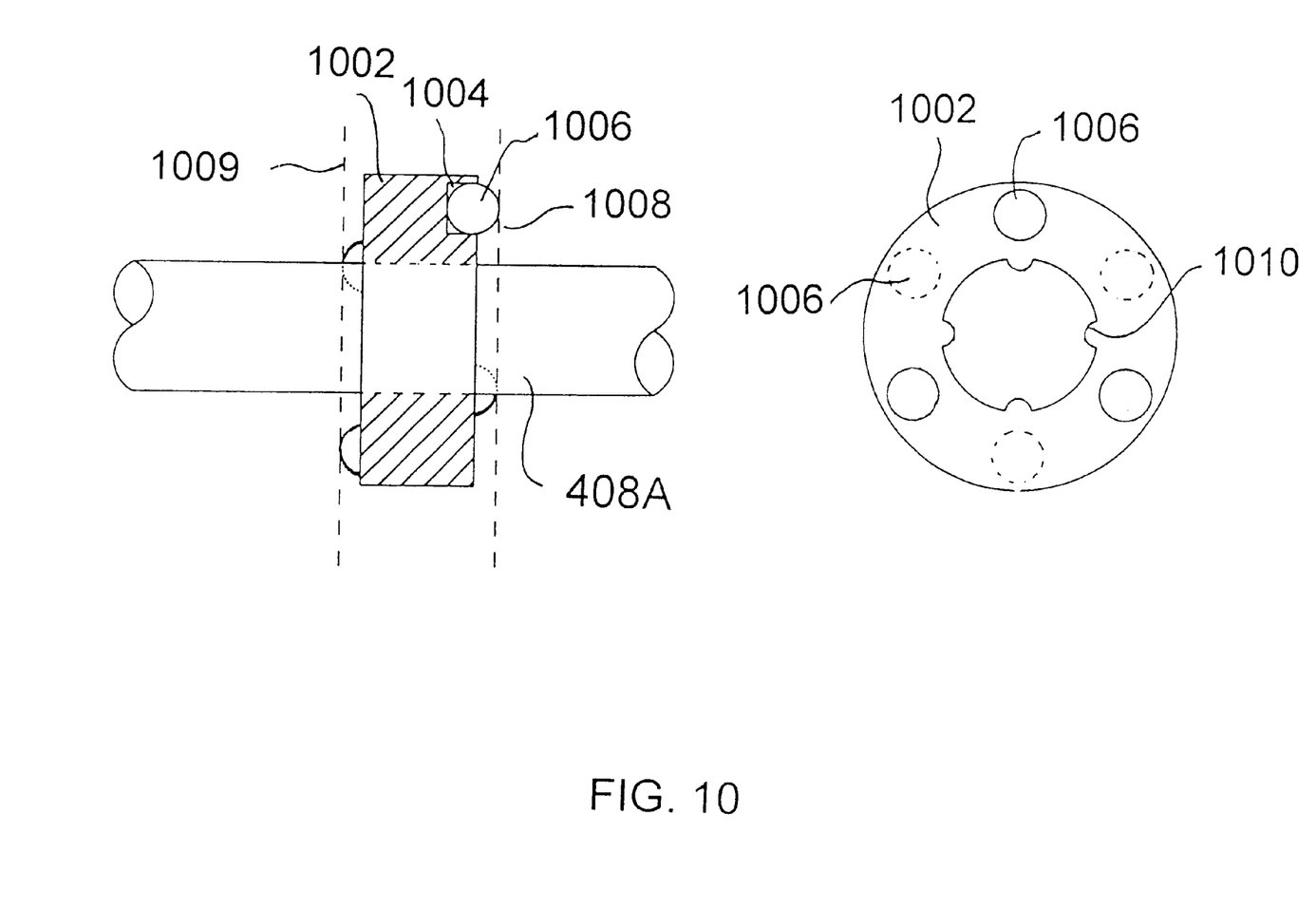
FIG. 10 is a structural diagram of the point contactor shown in FIG. 9.

Referring to FIG. 10, the structure of a point contactor is illustrated. The point contactor includes a rubber with predetermined thickness and steel balls, wherein the rubber is an annular rubber 1002 as shown in FIG. 10. On each side of the. annular rubber 1002, there are N holes 1004, in which the steel balls 1006 are inlaid. N is an integer which is equal to or larger than 1. If N=3, the apexes of the steel balls on each side of the annular rubber 1002 can form a plane. Further, when the steel balls on both sides of the annular rubber 1002 are arranged at equal intervals, the transmission of the vibrations generated by the dragging component 412 during the scanning operation can be effectively reduced. The apexes of the steel balls 1006 on both sides of the annular rubber 1002 form contact planes 1008 and 1009, wherein the apexes of steel balls 1006 are contact points. The point contactors are respectively connected to the transmitting component 406 and the securing apparatus 402 at the contact planes 1008 and 1009. On the inner side of the annular rubber 1002, there are ribbed-contact points 1010. By controlling the height of the ribbed-contact points 1010 to the contact plane 1008 or 1009, the preload is imposed.

Therefore, when proceeding with the scanning process, the point contactors 902 and 904 can only move along the guiding shaft 408A. Thus, the forces in other directions are limited. Further, the contacts between the point contactors 902, 904 and the transmitting component 406 or the securing apparatus 402 are point-contacts. The vibrations transmitted to the securing apparatus 402 from the dragging component 412, such as the vibrations of the steel rope, the belt, the clutching of the gear train, or the disequilibrium of the belt forces are reduced to the most. Furthermore, the preload is imposed on the guiding shaft 408A by the ribbed-contact points 1010, which confine the point contactors 902 and 904 to move along the guiding shaft 408A. Therefore, the vibrations in the vertical direction of the transmitting component 406 can only be transmitted to the securing apparatus 402 by the point contactors. Thus, the relative vibrations between the securing apparatus 402 and the image receiving apparatus 414 can be effectively reduced and thus improve the quality of scanning.

The invention is not limited to the point contactors. Other small-area, protruding-point, or acicular-contact objects can also be used to take the place of the point contactors. Since the point contactors 902 and 904 impose a preload on the guiding shaft 408A, a force is needed to steadily drive the point contactors 902 and 904. Also, the annular rubber 1002 has a low-rigidity property and thus the vibrations transmitted to the securing apparatus 402 can be reduced.

Figure 11:
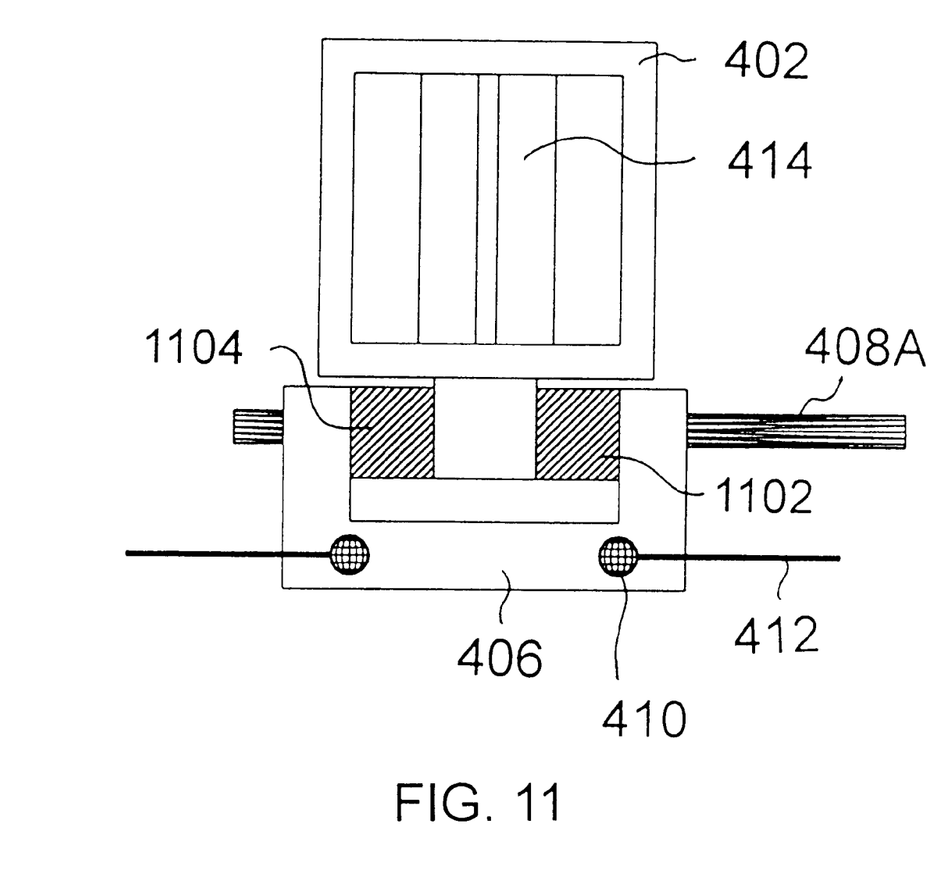
FIG. 11 is a lateral view of the transmission arrangement of the low-rigidity indirect-contact component utilizing rubbers.

Referring to FIG. 11, rubbers 1102 and 1104 with predetermined thickness are utilized as the indirect-contact, low-rigidity component. That is, the rubbers 1102 and 1104 are used to absorb the vibrations generated by the dragging component 412 and the transmitting component 406 during the transmission operation. Accordingly, the vibrations transmitted to the securing apparatus 402 can be lowered and the image quality can be improved.

Figure 12:
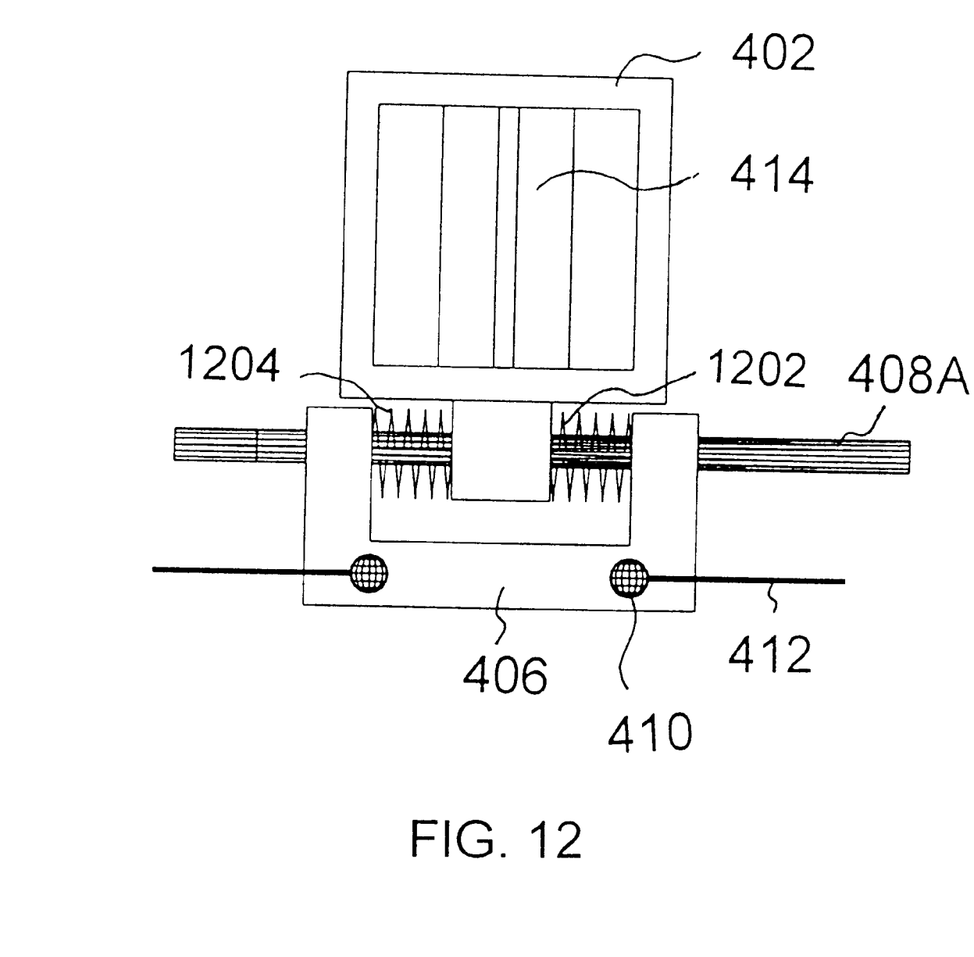
FIG. 12 is a lateral view of the transmission arrangement of the low-rigidity indirect-contact component utilizing springs.

Referring to FIG. 12, springs 1202, 1204, with an appropriate spring rate (spring constant), are utilized as an indirect-contact component to replace rubbers as mentioned above. That is, by utilizing the low-rigidity property of the springs, the purpose of reducing the vibrations in the invention can be achieved.

Figure 13:
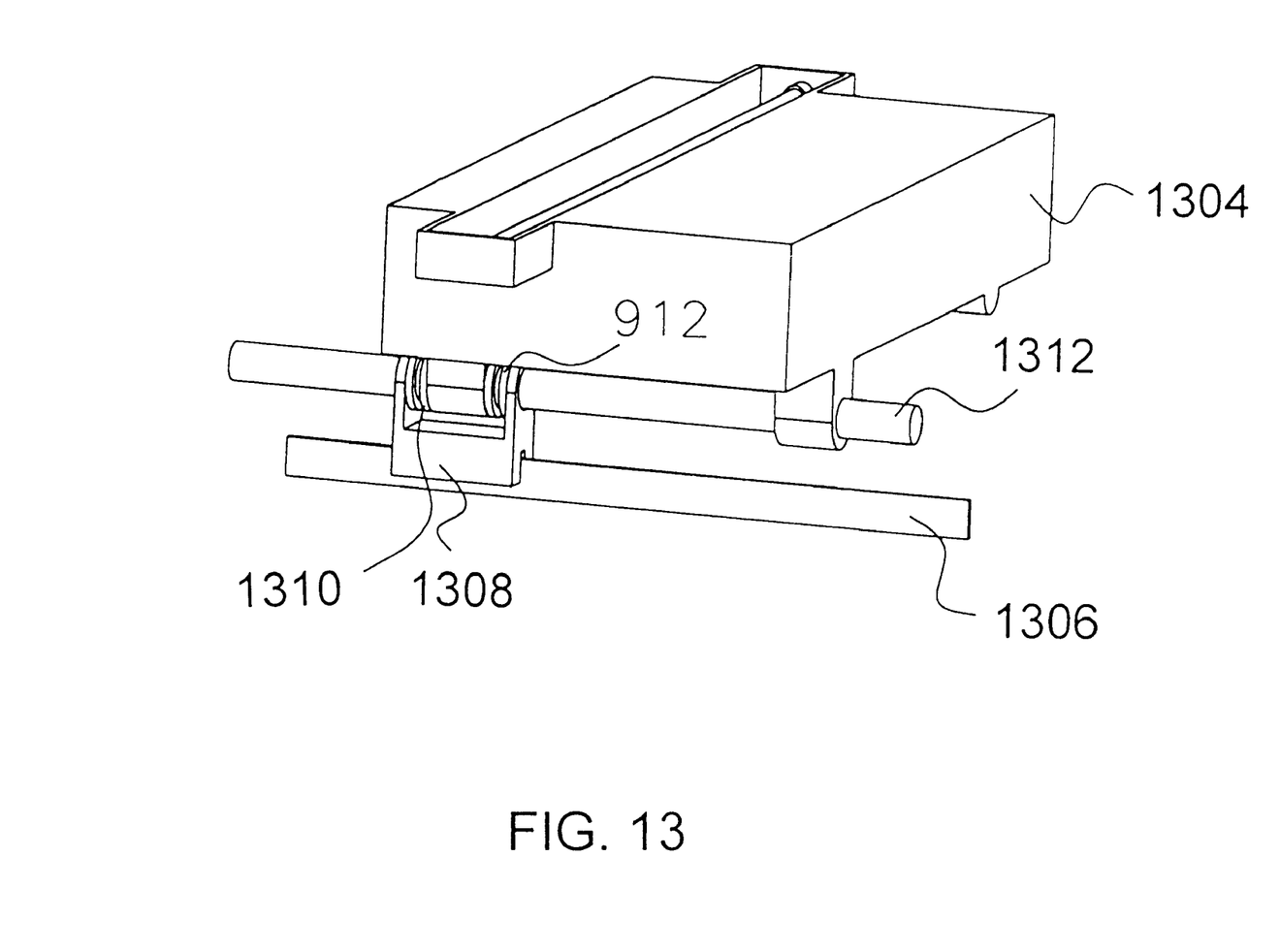
FIG. 13 is a perspective view of another transmission arrangement of the indirect-contact image scanning apparatus utilizing magnetic pairs.

FIG. 13 illustrates an embodiment according to the invention applied to a flatbed scanner. In FIG. 13, the dragging component 1306 drives the image receiving apparatus 1304 by the indirect-contact, gap-controllable component, such as the magnetic pairs mentioned above. The first magnetic pair 1310 and the second magnetic pair 912 are located between the image receiving apparatus 1304 and the transmitting component 1308. When the scanning operation starts, the dragging component 1306 drives the image receiving apparatus 1304 along the guiding shaft 1312 via the transmitting component 1308 and the indirect-contact, gap-controllable component, that is, the first magnetic pair 1310 and the second magnetic pair 912. Obviously, any of the above-mentioned indirect-contact components, such as airstream-generating pairs, the point-contact component or indirect-contact, low-rigidity component can be applied to the apparatus shown in FIG. 13. Furthermore, the transmitting component 1308 is fixed on the dragging component 1306, so there are no connecting points shown in the figure. In addition, as described in Description of the Related Art, the flatbed scanner further includes a window glass above the case of the flatbed, wherein the object to be scanned is placed.

According to the present invention, the indirect-contact component is utilized to drive either the securing apparatus or the image receiving apparatus. Thus, a steady relative movement between the securing apparatus and the image receiving apparatus is achieved to improve the quality of scanning. The transmission arrangement according to the present invention can be applied to the image scanning apparatus, such as the flatbed scanner for scanning a transparent or opaque document, the film scanner, photocopier, or the multi-functional peripherals.

In the above-mentioned embodiments according to the invention, the indirect-contact, gap-controllable arrangement component, the point-contact component or the low-rigidity components are utilized to reduce the vibrations generated and transmitted by the dragging component. Thus, the scanning quality can be greatly improved.

While the invention has been described by way of example and in terms of the preferred embodiments, it is to be understood that the invention is not limited to the disclosed embodiments. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image reading apparatus for retrieving the image of an object, comprising:

a securing apparatus for holding the object;

an image receiving apparatus for receiving light from the object to generate electrical signals corresponding to the image of the object;

a magnetic pair coupling a transmitting component to one of the securing apparatus and the image receiving apparatus by a dragging component, said magnetic pair forming a gap which separates the transmitting component from one of the securing component and the image receiving apparatus at a point of coupling, said magnetic pair comprising a first magnet and a second magnet, wherein like poles of the first magnet and the second magnet are arranged face to face, said first magnet and said second magnet are respectively connected to the transmitting component and one of the securing component and the image receiving apparatus.

2. The image reading apparatus of claim 1, further comprises:

a lighting module for emitting light to the object.

3. The image reading apparatus of claim 1, wherein the light is reflected from an opaque object or transmitted from a transparent object.

4. The image reading apparatus according to claim 1, wherein said magnetic pair comprises a permanent magnet.

5. The image reading apparatus according to claim 1, wherein said magnetic pair comprises an electromagnet.

6. An image reading apparatus for retrieving the image of an object, comprising:

a securing apparatus for holding the object;

a lighting module for emitting light to the object;

an image receiving apparatus for receiving light from the object to generate electrical signals corresponding to the image of the object;

an airstream-generating pair for coupling a transmitting component to one of the securing apparatus and the image receiving apparatus, said airstream-generating pair comprising a plurality of air-jetting holes; and a dragging component to drive the transmitting component for generating relative movement between the securing apparatus and the image receiving apparatus.

7. A scanning apparatus for retrieving the image of a scanning object, comprising:

a window glass for holding the object;

a lighting module for emitting light to the object;

an image receiving apparatus for receiving light from the object to generate electrical signals corresponding to the image of the object;

a point contactor for coupling a transmitting component to the image receiving apparatus, said point contactor comprising a rubber having two lateral faces and at least three steel balls for each lateral face, wherein said rubber is arranged with at least three holes on each lateral face to accommodate said steel balls; and a dragging component for driving the transmitting component so that the image receiving apparatus can move relatively to the scanning object.

* * * * *